(Model.)

W. J. PULVER.
HARVESTER REEL.

No. 270,336. Patented Jan. 9, 1883.

Attest:
F. W. Howard
E. M. Fowler

Inventor:
William J. Pulver
By Parker H. Sweet Jr. atty.

(Model.)

W. J. PULVER.
HARVESTER REEL.

No. 270,336. Patented Jan. 9, 1883.

2 Sheets—Sheet 2.

Attest;
F. W. Howard
E. M. Fowler.

Inventor;
William J. Pulver
By Parker & Sweet Jr.
Attys.

UNITED STATES PATENT OFFICE.

WILLIAM J. PULVER, OF PAW PAW, ILLINOIS.

HARVESTER-REEL.

SPECIFICATION forming part of Letters Patent No. 270,336, dated January 9, 1883.

Application filed May 19, 1882. (Model.)

*To all whom it may concern:*

Be it known that I, WILLIAM J. PULVER, a citizen of the United States, residing at Paw Paw, in the county of Lee and State of Illinois, have invented certain new and useful Improvements in Picker-Reels for Harvesters; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to a picker-reel for harvesters; and the novelty consists in the construction and arrangement of parts, as will be more fully hereinafter set forth, and specifically pointed out in the claims.

The object of the invention is to provide a reel having bearings to enable it to be adjusted forward or back, with means for automatically throwing the picker-teeth into operation to elevate "laying" grass or grain, thus presenting it in proper position to be acted upon by the cutters, and holding it until cut, then automatically releasing it, and allowing it to fall upon the floor or elevator, and means for throwing said picker-teeth entirely out of operation.

Figure 1:
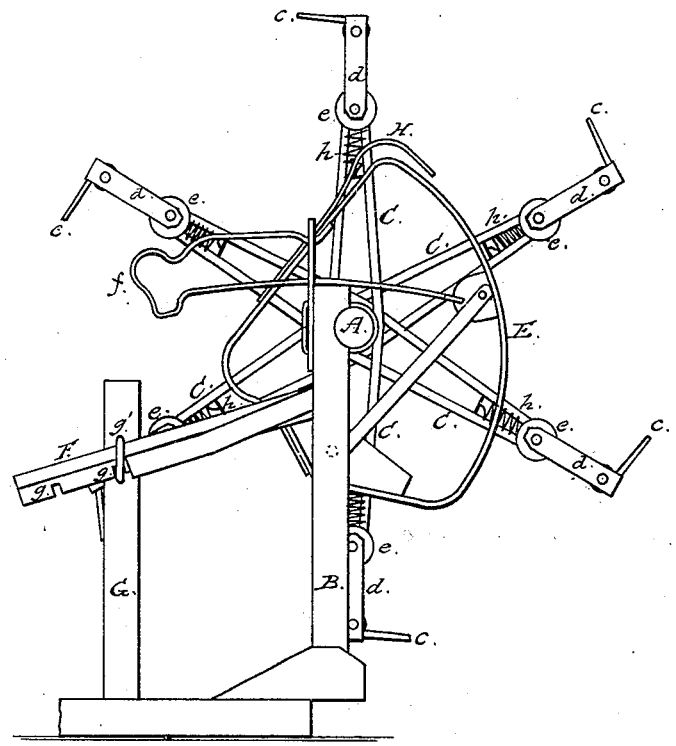
Figure 2:
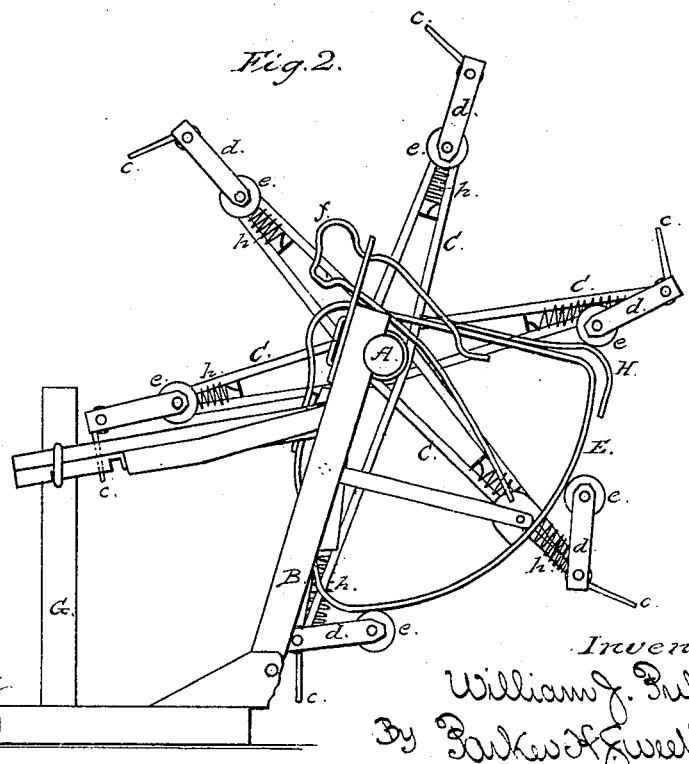
Figure 3:
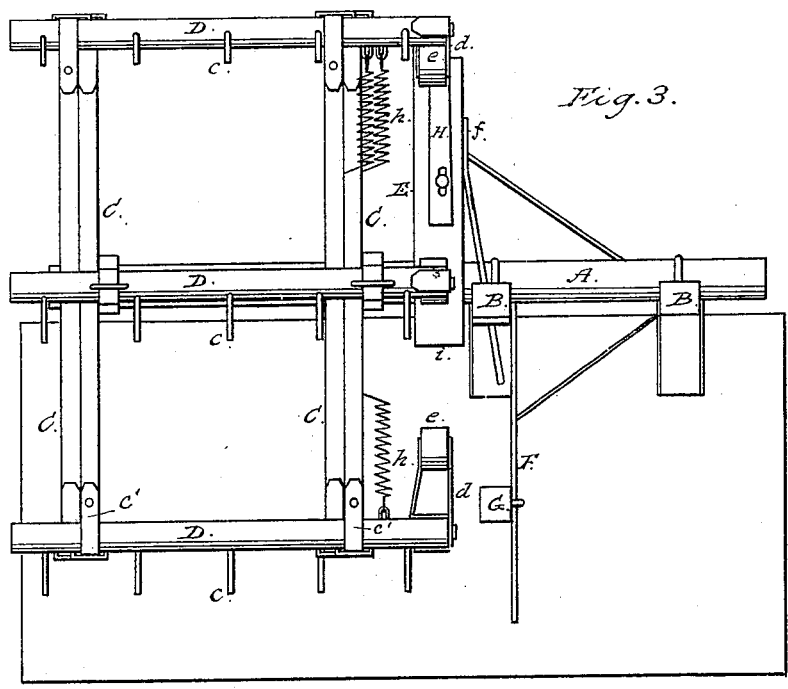

The invention is fully illustrated in the accompanying drawings, in which Figure 1 is an end elevation, showing the reel-cam out of service; Fig. 2, a similar view with the same in service, and Fig. 3 a top plan view.

Referring to the drawings, A represents the reel-shaft, receiving its power from the gear of the harvester in any well-known manner, said shaft being properly journaled in pivoted standards B, from which an arm, F, having notches $g$, extends rearward. The notches $g$ engage with a stop, $g'$, upon the rigid standard G, allowing the standards B to be adjusted forward or back at will.

E represents a cam pivoted to one of the standards B, and which is adapted to be thrown in or out of operation, and locked in either position by a spring-locking arm, $f$, having sharp bends adapted to engage with a bracket secured to the standard B.

C C represent the radial arms of the reel, which embrace the shaft A at their centers, and have their ends secured together by straps or plates and rivets $c'$, which furnish bearings for the rock-shafts D, which carry the teeth or pickers $c$. Upon one end of each of these rock-shafts D is secured a crank-arm, $d$, in which is journaled a friction-roller, $e$, which, when the cam is in the position shown in Fig. 2, rides over the cam-surface for about one-fourth of the revolution of the reel, thus rocking the shaft D and projecting the teeth $c$ nearly in line with the radial arms C. While in this position the fingers $c$ catch the fallen grain and hold it up to the knives until cut. The rollers $e$ then ride off the cam-surface, and the teeth liberate the grain by the action of the springs $h$, which force the rock-shafts D back into the position shown in Fig. 1. H represents a spring secured to the cam, and adapted to take up the concussion as the rollers $e$ strike the cam.

I attach importance, first, to the pivoted reel-standards; second, to the pivoted cam, having the spring H, and adapted to be thrown in or out of operation by the driver; third, in in the construction of the reel-arms C, and, fourth, in the automatic operation of the rock-shafts D and teeth $c$.

What I claim as new is—

1. A picker-reel journaled in pivoted standards adapted to be adjusted forward and back, and the oscillating teeth or pickers carried by said reel, in combination with a cam for oscillating said teeth, and means by which said cam may be thrown in or out of service at will, as and for the purposes set forth.

2. In a reel, the radial arms C, formed in pairs, embracing and secured to the shaft, and the ends secured together by straps and rivets, in combination with a rock-shaft provided with picker-teeth and rocking in bearings formed by said straps, as set forth.

3. The rock-shafts D, having picker-teeth $c$, and crank-arms $d$, having rollers $e$, combined with the cam E and springs $h$, as set forth.

4. The pivoted cam E, having cushion-spring H, combined with the spring-locking arm $f$, rock-shafts D, and spring $h$, as set forth.

5. The combination of the reel, the pivoted standards B, their means for adjustment, the pivoted cam E, having spring H, the rock-shafts D, springs $h$, and locking-arm $f$, as and for the purposes set forth.

In testimony whereof I affix my signature in presence of two witnesses.

WILLIAM J. PULVER.

Witnesses:
I. H. PULVER,
H. H. BRISTOW.